(12) United States Patent
Wan et al.

(10) Patent No.: US 9,483,736 B2
(45) Date of Patent: Nov. 1, 2016

(54) FILTERING USER ACTIONS BASED ON USER'S MOOD

(71) Applicant: Empire Technology Development LLC, Wilmington, DE (US)

(72) Inventors: Feng Wan, Issaquah, WA (US); Raghuram Madabushi, Seattle, WA (US); Yiyang Wang, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 731 days.

(21) Appl. No.: 13/988,015

(22) PCT Filed: Oct. 23, 2012

(86) PCT No.: PCT/US2012/061436
§ 371 (c)(1),
(2) Date: May 16, 2013

(87) PCT Pub. No.: WO2014/065781
PCT Pub. Date: May 1, 2014

(65) Prior Publication Data
US 2014/0114899 A1    Apr. 24, 2014

(51) Int. Cl.
    G06N 5/04        (2006.01)
    G06Q 10/10       (2012.01)
    G06Q 50/00       (2012.01)

(52) U.S. Cl.
    CPC .............. *G06N 5/04* (2013.01); *G06Q 10/107* (2013.01); *G06Q 50/01* (2013.01)

(58) Field of Classification Search
    CPC ........ G06N 5/04; G06N 5/02; G06Q 10/107; G06Q 10/109; G06Q 50/01; G06F 15/16
    USPC ...................................... 706/46–47; 709/204
    See application file for complete search history.

(56) References Cited

U.S. PATENT DOCUMENTS

| | | | |
|---|---|---|---|
| 7,940,186 B2 * | 5/2011 | Aaron .................... | G06Q 30/02 340/522 |
| 2007/0173733 A1 * | 7/2007 | Le .......................... | G06F 19/363 600/544 |

(Continued)

OTHER PUBLICATIONS

International Search Report and Written Opinion filed on Oct. 23, 2012, mailed Jan. 7, 2013.
"Before You Send That Angry Email": michaelhyatt.com/angry-email.html, Michael Hyatt Intentional Leadership, Jun. 18, 2012.
Kulkarni et al., "Facial expression (mood) recognition from facial images using committee neural networks", BioMedical Engineering OnLine, BioMed Central, Aug. 5, 2009.

(Continued)

*Primary Examiner* — Stanley K Hill
*Assistant Examiner* — Dave Misir
(74) *Attorney, Agent, or Firm* — Turk IP Law, LLC

(57) ABSTRACT

Technologies are provided for filtering user's actions based on user's mood. User's actions may include online actions. To prevent "in the heat of the moment" actions, which a user may regret later, a mood based filter may identify a user action such as posting a message to a social network, a professional network, an email network, a blog, or an instant message network. An automatic system action may then be taken based on the detected user's mood. In some examples, the user's mood may be assigned to a numeric or alphanumeric category. Various system actions such as blocking or delaying the user action may be tied or associated to the user's mood category through one or more predefined, customizable rules. In other examples, a user confirmation of the user action may also be included in addition to the automatic system action.

21 Claims, 6 Drawing Sheets

(56) References Cited

U.S. PATENT DOCUMENTS

| | | | |
|---|---|---|---|
| 2009/0063992 A1* | 3/2009 | Gandhi | G06F 3/011 |
| | | | 715/752 |
| 2010/0057875 A1 | 3/2010 | Bychkov et al. | |
| 2010/0123588 A1* | 5/2010 | Cruz Hernandez | A61B 5/02438 |
| | | | 340/573.1 |
| 2010/0158238 A1* | 6/2010 | Saushkin | G06Q 10/06 |
| | | | 379/265.12 |
| 2010/0205129 A1* | 8/2010 | Aaron | G06Q 30/02 |
| | | | 706/14 |
| 2012/0110096 A1 | 5/2012 | Smarr et al. | |
| 2012/0226993 A1 | 9/2012 | Bromer | |
| 2014/0101296 A1* | 4/2014 | Li | G06Q 30/02 |
| | | | 709/221 |

OTHER PUBLICATIONS

Cameron, "Introducing the Mind Reading Computer"; computer.howstuffworks.com/mind-reading-computer-news.htm, Jun. 26, 2006.

Agrawal et al., "Mood Detection: Implementing a facial expression recognition system", Stanford University, CS 229 Machine Learning Final Projects, May 2009.

"Keystroke Dynamics", accessed at https://web.archive.org/web/20120819184341/http://www.biometric-solutions.com/solutions/index.php?story=keystroke_dynamics, accessed on Jan. 23, 2015, pp. 1-2.

Giacomelli, P., et al., "Using Soft Computer Techniques on Smart Devices for Monitoring Chronic Diseases: the CHRONIOUS case," The Third International Conference on eHealth, Telemedicine, and Social Medicine (eTELEMED 2011), pp. 5 (Mar. 16, 2011).

\* cited by examiner

FILTERING USER ACTIONS BASED ON USER'S MOOD

CROSS-REFERENCE TO RELATED APPLICATION

This Application is the U.S. National Stage filing under 35 U.S.C. §371 of PCT Application No. PCT/US2012/61436 filed on Oct. 23, 2012. The PCT Application is hereby incorporated by reference in its entirety.

BACKGROUND

In an increasingly accessible and networked communication environment, exchange of information through text messages, email, postings, and other forms is easier. The ease of information exchange brings with it potential disadvantages and risks. Non-electronic forms of communication (e.g., letters, etc.) are more time-consuming, but at the same time enable the author to think about the message. Electronic communication, on the other hand, is faster. This means messages may be sent "in the heat of the moment", and the author may not be able to take back a sent/posted message even if they subsequently regret sending/posting the message.

In addition, when people interact with each other in real life, they typically filter what they say or do because they are receiving an active feedback from the other person through visual cue, body language, etc. However, online interactions in a virtual world (such as on a social network) do not have a real-time-feedback or filtering mechanism. Furthermore, in real world, by sheer physical limitation, a person may only be able to interact with a limited number of people at one time. In the virtual world, there is no limitation technically and the posted information may be online for an indefinite period of time.

SUMMARY

The present disclosure generally describes techniques for introducing automatic system actions in response to detected user's mood. According to some embodiments, the present disclosure provides a method for filtering user's actions based on user's mood. The method may include detecting a user's mood; determining a mood indicator value based on the detected user's mood; identifying a user action; determining a system action based on the mood indicator value and the user action; and/or applying the system action.

According to other embodiments, the present disclosure also provides a computing device for filtering user's actions based on user's mood. The computing device may include a memory configured to store instructions and a processor configured to execute a mood based control application in conjunction with the instructions stored in the memory. The mood based control application may be configured to detect a user's mood; determine a mood indicator value based on the detected user's mood; identify a user action; determine a system action based on the mood indicator value and the user action; and/or apply the system action.

According to further embodiments, the present disclosure also describes a computer readable memory device with instructions stored thereon for filtering user's actions based on user's mood. The instructions may include detecting a user's mood; determining a mood indicator value based on the detected user's mood; identifying a user action; determining a system action based on the mood indicator value and the user action; and/or applying the system action.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
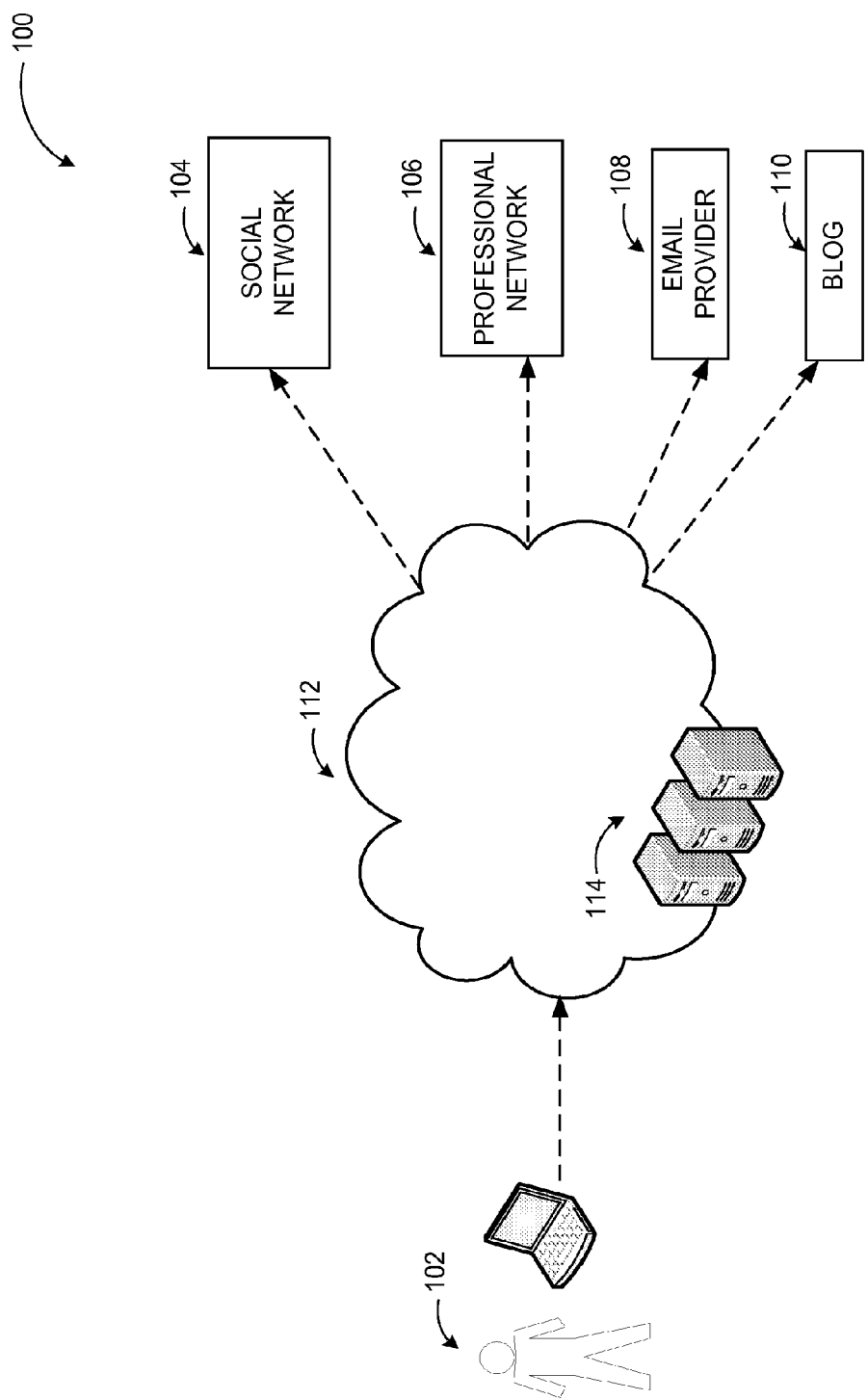
FIG. 1 conceptually illustrates an example system for filtering user's actions based on user's mood.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to filtering user's actions based on user's mood.

Briefly stated, technologies are provided for filtering user's actions based on user's mood. User's actions may include online actions. To prevent "in the heat of the moment" actions, which a user may regret later, a mood based filter may identify a user action such as posting a message to a social network, a professional network, an email network, a blog, or an instant message network. An automatic system action may then be taken based on the detected user's mood. In some examples, the user's mood may be assigned to a numeric or alphanumeric category. Various system actions such as blocking or delaying the user action may be tied or associated to the user's mood category through one or more predefined, customizable rules. In other examples, a user confirmation of the user action may also be included in addition to the automatic system action.

FIG. 1 conceptually illustrates an example system for filtering user's actions based on user's mood, arranged in accordance with at least some embodiments described herein.

As demonstrated in a diagram 100, a networked environment 112 may provide a variety of communication networks for enabling a user 102 to post and share information to a communication network. An example communication network may include a social network 104, a professional network 106, a blog 110, and an email provider 108 as some examples. One or more servers 114 associated with the networked environment 112 may enable the user 102 to post content such as a status update, personal information, professional information, comments, and personal messages directly to a selected communication network via a web browser and/or application associated with the user's client device. The client device may host a platform for enabling the user 102 to post content over the networked environment 112 to the communication network as a posting, an instant message (e.g., Short Message Service "SMS" message), and/or an email message from the client device. The client device may also be configured to enable the user 102 to post audio/visual recordings to the one or more communication networks, including pictures, videos and audio files. A posting may also include an indication of a location of the user 102 (e.g., via Global Positioning Service "GPS" or similar means) or other sensor-driven data such as presence, heart rate, blood pressure, etc. of the user 102.

In a typical scenario, the user 102 may send or post messages or other content (e.g., audio, video) to other individual users or a general audience through one or more of the networks and service providers effectively in real time. While the posting can be immediate, such communication lacks aspects of a real conversation such as user's facial expressions, body language, context of the communication, etc., which are typically not carried along with the posted message. Thus, there is a risk of misunderstanding or misinterpretation by the receivers of the message. The immediate posting/sending capability may also reduce the time a user may take to rethink the message and carefully word the content.

For example, the user 102 may be upset about an event and may post a comment on the social network 104. Subsequently, the user 102 may discover additional information or facts about the event and may no longer agree with their initial comment. However, with conventional communication systems (e.g., social networks, blogs, etc.), once the comment is posted, it may be very difficult, if at all possible, to remove it completely. Copies of web pages may be stored in various servers for a very long period. In another example, the user may post a comment as a joke with a smiling expression, but without the user's facial expression, the comment may be misconstrued.

A user action filtering system according to some embodiments may detect the user's mood while the user is performing or taking the user action (e.g., typing the message) and determine a system action based on the detected mood. For example, upon detecting the user being in a sad or upset mood and identifying the user action as a posting to a wide audience (possibly with strong content), the system may delay the posting of the message and/or present a confirmation option. This may enable the user 102 to rethink the message, possibly when their mood has changed, and prevent a regrettable action.

Figure 2:
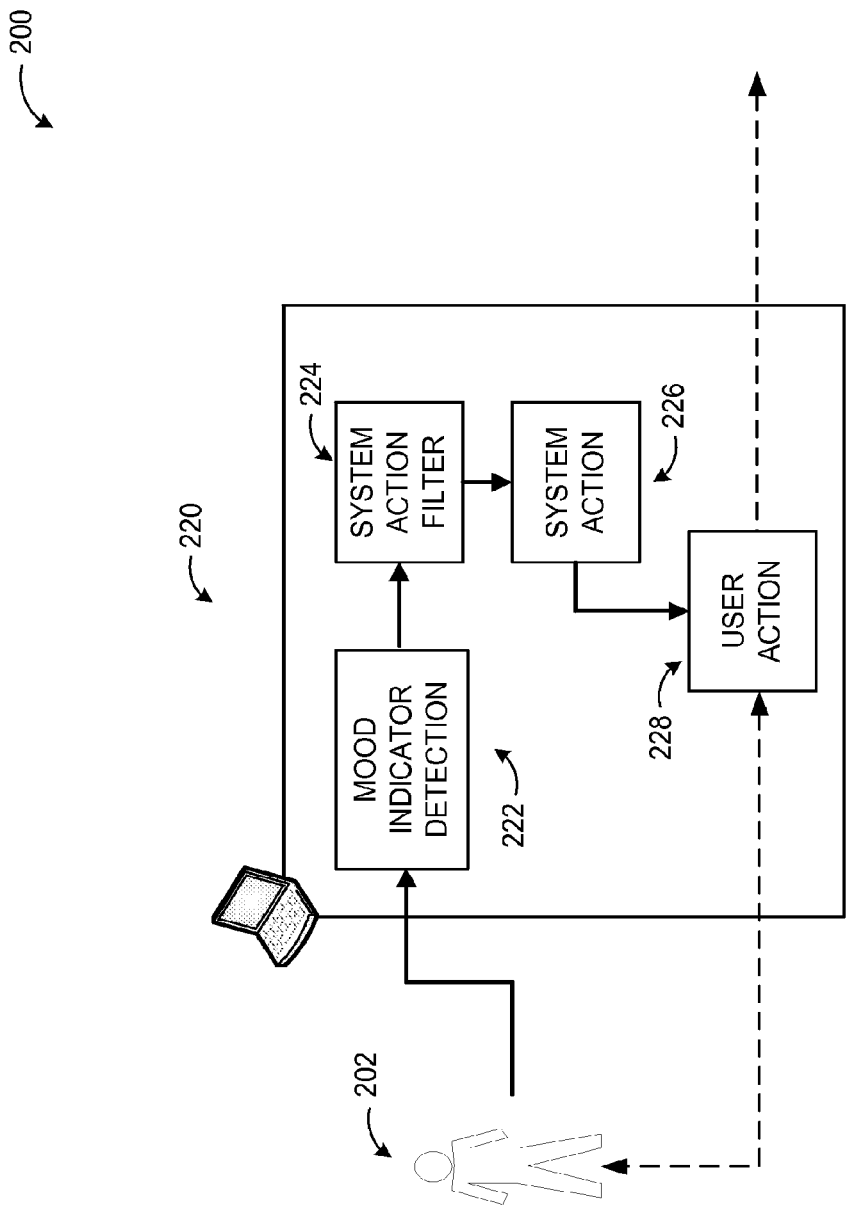
FIG. 2 illustrates example components of a system for filtering user's actions based on user's mood.

FIG. 2 illustrates example components of a system for filtering user's actions based on user's mood, arranged in accordance with at least some embodiments described herein.

In a system 200 according to some examples, the example components for filtering user's actions based on user's mood may include a mood indicator detection module 222, a system action filter module 224, a collection of system actions 226, and a collection of user's actions 228, among other components. These components may be executed by and/or stored locally on a computing device 220 associated with a user 202 or be part of a hosted service and accessed using or through the computing device 220.

The mood indicator detection module 222 may be implemented as a software application executed locally on the user computer 220 or be part of a hosted service such as a social network application, an email exchange application, etc. The mood indicator detection module 222 may be associated with one or more physical detectors such as an image capture device, a biological parameter measurement device (e.g., blood temperature measurement device), and so on. The mood indicator detection module 222 may be configured to detect the user's mood through one or more of keystroke dynamics detection, facial feature analysis, body composure analysis, biological parameter analysis, and/or recent communication content analysis. The keystroke dynamics may include keystroke strength and/or keystroke speed. The biological parameters may include a blood pressure, a heartbeat, and/or a body temperature.

The mood indicator detection module 222 may be configured to assign the detected user's mood to a numeric or alphanumeric category. For example, the alphanumeric categories may include "happy", "neutral", "sad", "depressed", "angry", and so on.

The system action filter module 224 may be configured to determine a suitable system action among the collection of system actions 226 based on applying one or more rules that relate system actions to user's actions based on the user's mood. For example, a rule may state "if the user's mood is sad and the user action is posting a message to a broad audience, delay the user action by 12 hours", "if the user's mood is depressed and the user action is sending an email to a family member, allow the email", and comparable statements. The rules may be predefined rules that are customizable by the user. The user 202 may also be enabled to define the rules. The system action filter module 224 may also prompt the user to confirm application of the system action. In other examples, the system action filter module 224 may perform a calibration of mood detection based on user characteristics.

The system action filter module 224 may also be configured to determine the system action based on one or more of a time of day, a location of the user, and a computing device employed by the user. For example, use of a smart phone may indicate the user is not paying particular attention to the message being created as opposed to the user performing the same action at a desktop computer. Similarly, if the user is at a shopping location or sporting event, they may be more likely to create a posting with less attention than when they are at work or at home.

Examples of the system actions in the system action collection 226 may include blocking the user action, delaying the user action for a predefined period, directing user action to a particular predefined destination (which may be anonymous), and so on. The predefined period may be user selectable (e.g., 12 hours, 24 hours, etc.). In some examples, the user action may be delayed for the predefined period and then allowed to be executed if there is no intervention by the user. In other examples, the user may be asked to confirm the action at the end of the predefined period. The user action collection 228 may be a database of previous user's actions, which may be used to identify a current user action by the system action filter module 224. The current user action may also be directly identified based on the user input. The user's actions may include posting a message to a social network, a professional network, an email network, a blog, or an instant message network, for example. Furthermore, user's actions are not limited to sending or posting messages (textual or otherwise). Other examples of user's actions may include making an online purchase, signing up to an online subscription, scheduling a meeting with others, and similar actions.

Figure 3:
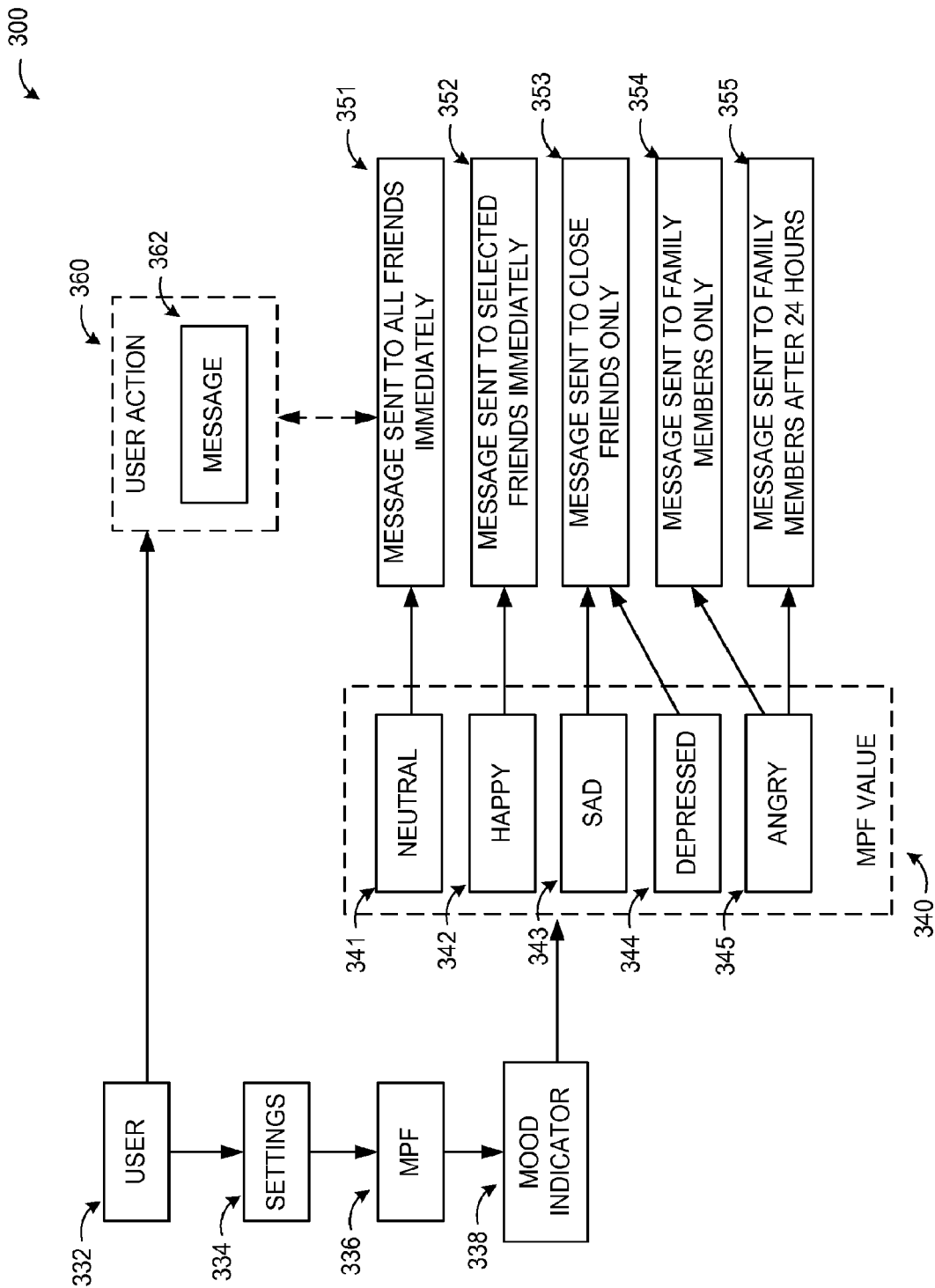
FIG. 3 illustrates an example scenario of filtering message posting actions of a user based on user's mood.

FIG. 3 illustrates an example scenario of filtering message posting actions of a user based on user's mood, arranged in accordance with at least some embodiments described herein.

In the example scenario shown in a diagram 300, a user action 360 includes sending of a message 362 created by a user 332. An example process may include a set of settings 334, which may be set up by the user and define user calibration values for mood detection, a timing of mood filter activation, and any user customized selections (e.g., customizations to the rules. A mood based message posting filter (MPF) 336 may be activated automatically or by user demand based on the settings 334. The MPF 336 may use a mood indicator 338, which may comprise MPF values 340.

MPF values 340 may include "neutral" 341, "happy" 342, "sad" 343, "depressed" 344, and "angry" 345 according the example scenario in the diagram 300. The type of the user action 360 (the message 362 being sent) may trigger selection of a number of system actions (351 through 355). One or more rules employed by the MPF 336 may enable selection of one of the system actions based on the determined MPF value. For example, if the MPF value is "neutral" 341, the corresponding system action may be "message sent to all friends immediately" 351. If the MPF value is "happy" 342, the corresponding system action may be "message sent to selected friends immediately" 352. If the MPF value is "sad" 343 or "depressed" 344, the corresponding system action may be "message sent to close friends only" 353. If the MPF value is "angry" 345, the corresponding system actions may be "message sent to family members only" 354 or "message sent to family members after 24 hours" 355.

The above discussed MPF values and/or the system actions are examples for illustrative purposes and should not be construed as a limitation on embodiments. Additional or fewer MPF values and system actions may be used, predefined by the system and/or customized by the user 332. For example, the delay in sending the message may be set by the user. In addition, a confirmation prompt may be used to provide the user 332 with another opportunity to approve the action.

Figure 4:
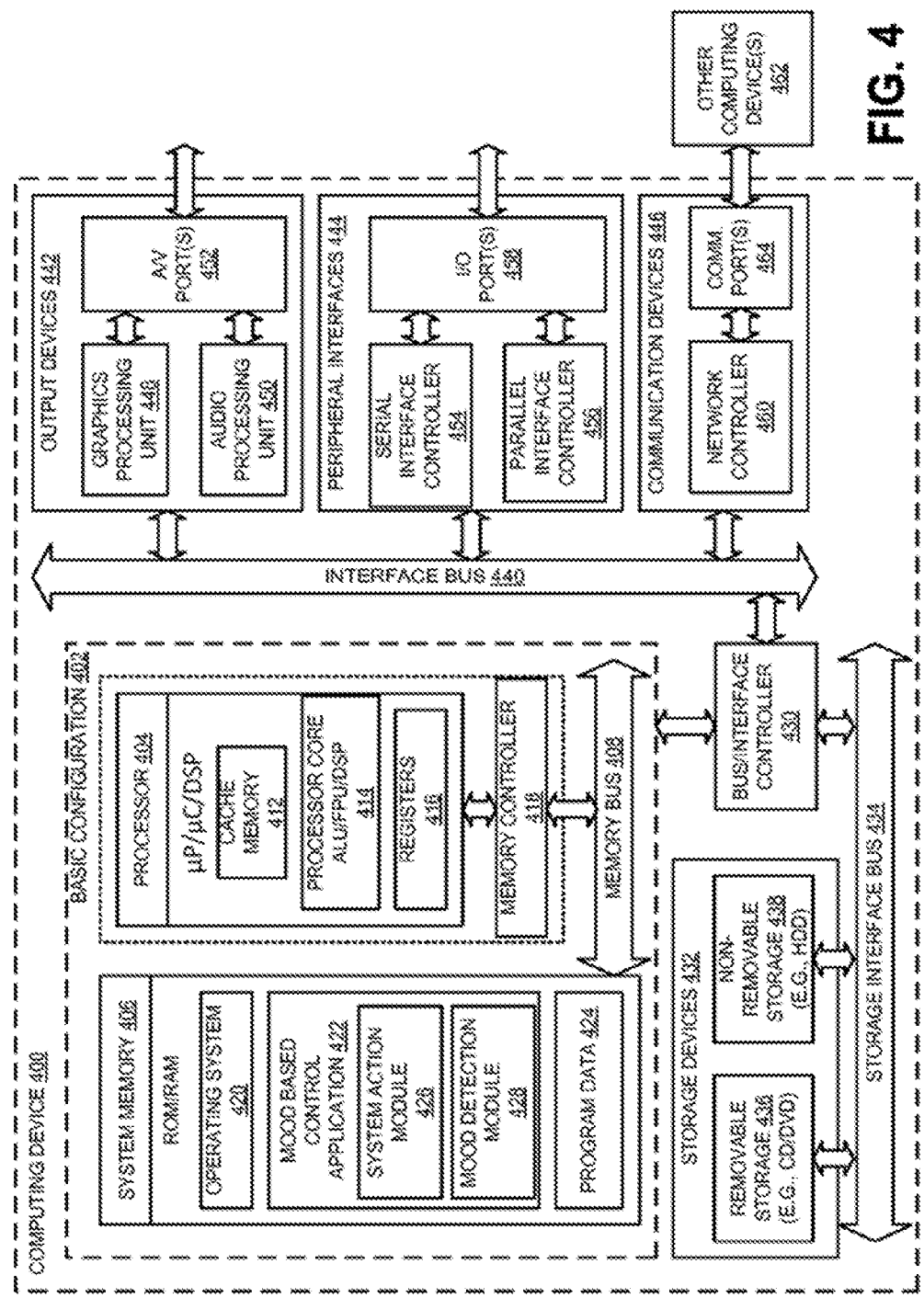
FIG. 4 illustrates a general purpose computing device, which may be used for filtering user's actions based on user's mood.

FIG. 4 illustrates a general purpose computing device, which may be used for filtering user's actions based on user's mood, arranged in accordance with at least some embodiments described herein. In a very basic configuration 402, a computing device 400 typically includes one or more processors 404 and a system memory 406. A memory bus 408 may be used for communicating between a processor 404 and the system memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a cache memory 412, a processor core 414, and one or more registers 416. An example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications, and program data 424. The applications may include a mood based control application 422, which may incorporate or cooperate with a system action module 426 that is arranged to identify a system action based on an identified user action and a user's mood as detected by a mood detection module 428. Program data 424 may include mood based filtering rules, identified system actions, and similar data. This described basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via the bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations. Moreover the computing device 400 may be implemented as a networked system or as part of a general purpose or specialized server.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
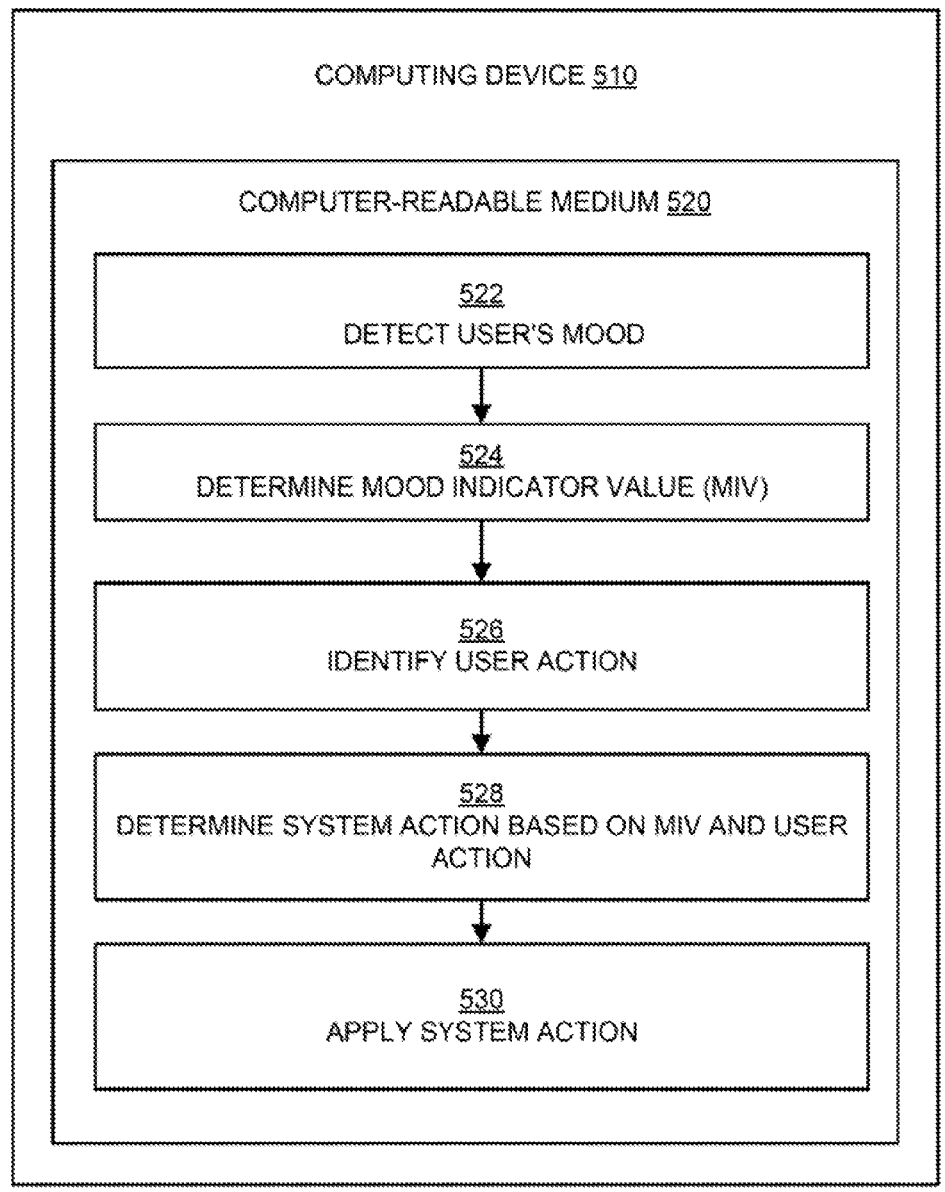
FIG. 5 is a flow diagram illustrating an example method that may be performed by a computing device such as the computing device in FIG. 4.

FIG. 5 is a flow diagram illustrating an example method that may be performed by a computing device such as the computing device 400 in FIG. 4, arranged in accordance with at least some embodiments described herein.

Example methods may include one or more operations, functions or actions as illustrated by one or more of blocks 522, 524, 526, 528 and/or 530. The operations described in blocks 522 through 530 may also be stored as computer-executable instructions in a computer-readable medium such as a computer-readable medium 520 of a computing device 510.

A process for filtering user's actions based on user's mood may begin with block 522, "DETECT USER'S MOOD." At block 522, the mood detection module 428 may detect a user's mood based on one or more parameters such as keystroke dynamics (strength, speed, etc.), biological parameters (blood pressure, body temperature), facial recognition, etc.

Block 522 may be followed by block 524, "DETERMINE MOOD INDICATOR VALUE (MIV)." At block 524, the mood detection module 428 may assign a numeric or alphanumeric category to the detected user's mood. "Happy", "sad", "depressed" are some examples of alphanumeric categories. A numeric categorization may include any predefined scale (e.g., 1 to 10). Type and granularity of the MIV values may be selected based on expected user's actions, control application characteristics (local or hosted application), user preferences, etc.

Block 524 may be followed by block 526, "IDENTIFY USER ACTION." At block 526, a user action to be filtered may be determined Example user's actions may include posting a message to one or more of a social network, a professional network, an email network, a blog, or an instant message network, etc.

Block 526 may be followed by block 528, "DETERMINE SYSTEM ACTION BASED ON MIV AND USER ACTION." At block 528, the system action module 426 may determine a suitable system action based on the determined MIV and the identified user action. The determination may be based on one more rules. The rules may be predefined and/or user definable/customizable.

Block 528 may be followed by block 530, "APPLY SYSTEM ACTION." At block 530, the system action such as delaying or blocking the posting/sending of the message may be applied.

The blocks included in the above described process are for illustration purposes. Filtering user's actions based on user's mood may be performed by similar processes with fewer or additional blocks. In some examples, the blocks may be performed in a different order. In some other examples, various blocks may be eliminated. In still other examples, various blocks may be divided into additional blocks, or combined together into fewer blocks. Although illustrated as sequentially ordered operations, in some implementations the various operations may be performed in a different order, or in some cases various operations may be performed at substantially the same time.

Figure 6:
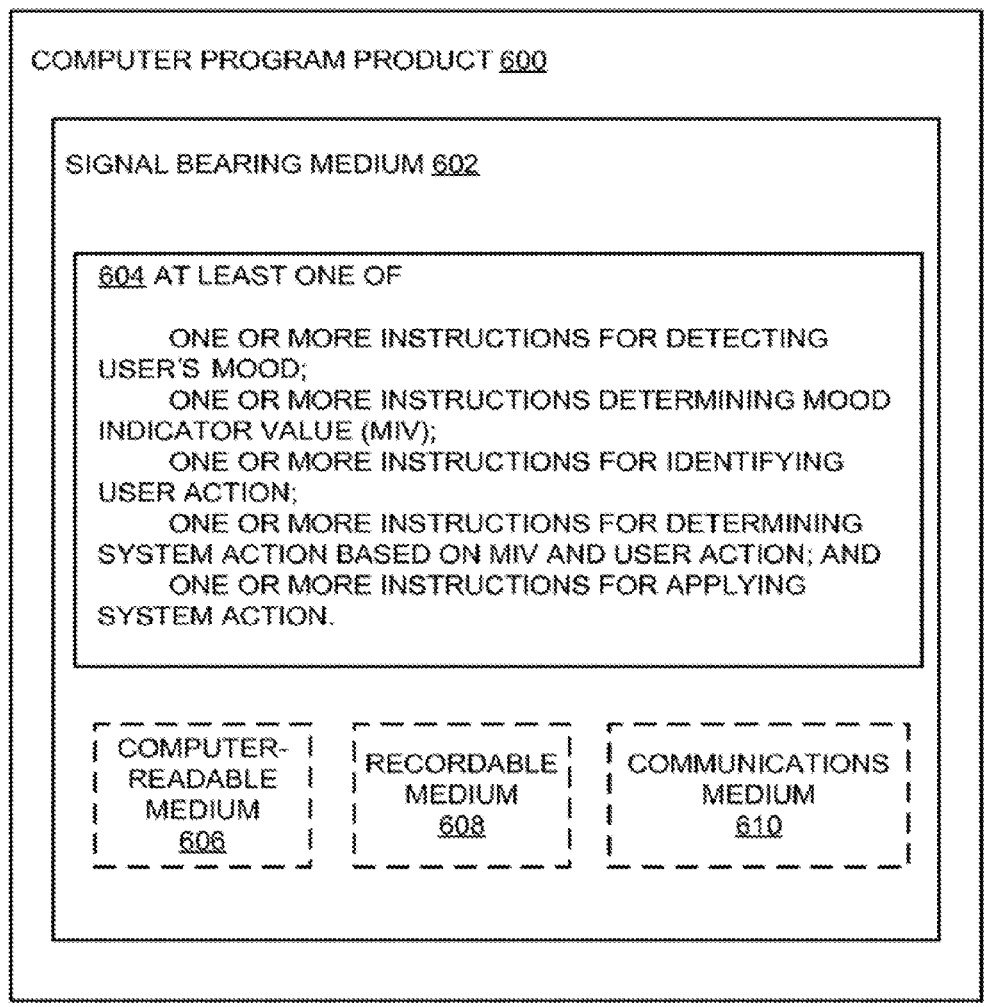
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, a computer program product 600 may include a signal bearing medium 602 that may also include machine readable instructions 604 that, when executed by, for example, a processor, may provide the functionality described above with respect to FIG. 4 and FIG. 5. Thus, for example, referring to the processor 404, the system action module 426 and/or the mood detection module 428 may undertake one or more of the tasks shown in FIG. 6 in response to the instructions 604 conveyed to the processor 404 by the signal bearing medium 602 to perform actions associated with automatically filtering user's actions based on user's mood as described herein. Some of those instructions may include detecting user's mood, determining mood indicator value (MIV), identifying user action, determining system action based on MIV and user action, and/or applying the system action.

In some implementations, the signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 is conveyed by a wireless communications medium 610 (e.g., a wireless communications medium conforming with the IEEE 802.11 standard).

The present disclosure provides a method for filtering user's actions based on user's mood. The method may include detecting a user's mood; determining a mood indicator value based on the detected user's mood; identifying a user action; determining a system action based on the mood indicator value and the user action; and/or applying the system action.

In some examples, the method may further include detecting the user's mood through one or more of: keystroke dynamics detection, facial feature analysis, body composure analysis, biological parameter analysis, and recent communication content analysis. The keystroke dynamics may include one or more of keystroke strength and keystroke speed. The biological parameters may include one or more of a blood pressure, a heartbeat, and a body temperature. The method may also include determining the mood indicator value as one of a plurality of alphanumeric categories; determining the mood indicator value as one of a plurality of numeric values; and/or determining the system action further based on one or more of a time of day, a location of the user, and a computing device employed by the user.

In other examples, the method may further include determining the system action based on applying one or more rules, where the one or more rules are predefined rules customizable by the user. The method may also include prompting the user to confirm application of the system action and/or performing a calibration of a mood detection module based on user characteristics. The system action may be blocking the user action or delaying the user action. The user action may be posting a message to one or more of a social network, a professional network, an email network, a blog, or an instant message network.

According to other embodiments, the present disclosure also provides a computing device for filtering user's actions based on user's mood. The computing device may include a memory configured to store instructions and a processor configured to execute a mood based control application in conjunction with the instructions stored in the memory. The mood based control application may be configured to detect a user's mood; determine a mood indicator value based on the detected user's mood; identify a user action; determine a system action based on the mood indicator value and the user action; and/or apply the system action.

In further examples, the mood based control application may be further configured to detect the user's mood through one or more of: keystroke dynamics detection, facial feature analysis, body composure analysis, biological parameter analysis, and recent communication content analysis. The keystroke dynamics may include one or more of keystroke strength and keystroke speed. The biological parameters may include one or more of a blood pressure, a heartbeat, and a body temperature. The mood based control application may also be further configured to determine the mood indicator value as one of a plurality of alphanumeric categories; determine the mood indicator value as one of a plurality of numeric values; determine the system action based on applying one or more rules; and/or determine the system action further based on one or more of a time of day, a location of the user, and a computing device employed by the user, where the one or more rules are predefined rules customizable by the user.

In yet other examples, the mood based control application may be further configured to prompt the user to confirm application of the system action; perform a calibration of a mood detection module based on user characteristics. The system action may be blocking the user action or delaying the user action. The user action may be posting a message to one or more of a social network, a professional network, an email network, a blog, or an instant message network. The computing device may be a desktop computer, a laptop computer, a handheld computer, a tablet computer, or a smart phone. The computing device may also be a server accessible to user computing devices through one or more networks.

According to further embodiments, the present disclosure also describes a computer readable memory device with instructions stored thereon for filtering user's actions based on user's mood. The instructions may include detecting a user's mood; determining a mood indicator value based on the detected user's mood; identifying a user action; determining a system action based on the mood indicator value and the user action; and/or applying the system action.

In some examples, the instructions may further include detecting the user's mood through one or more of: keystroke dynamics detection, facial feature analysis, body composure analysis, biological parameter analysis, and recent communication content analysis. The keystroke dynamics may include one or more of keystroke strength and keystroke speed. The biological parameters may include one or more of a blood pressure, a heartbeat, and a body temperature. The instructions may also include determining the mood indicator value as one of a plurality of alphanumeric categories; determining the mood indicator value as one of a plurality of numeric values; and/or determining the system action further based on one or more of a time of day, a location of the user, and a computing device employed by the user.

In other examples, the instructions may further include determining the system action based on applying one or more rules, where the one or more rules are predefined rules customizable by the user. The instructions may also include prompting the user to confirm application of the system action and/or performing a calibration of a mood detection module based on user characteristics. The system action may be blocking the user action or delaying the user action. The user action may be posting a message to one or more of a social network, a professional network, an email network, a blog, or an instant message network.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to filter user's actions based on user's mood, the method comprising:
    detecting a user's mood through one or more of: keystroke dynamics detection, facial feature analysis, body composure analysis, biological parameter analysis, and recent communication content analysis, wherein the biological parameters include one or more of a blood pressure, a heartbeat, and a body temperature;
    determining a mood indicator value based on the detected user's mood;
    identifying a user action, wherein the user action comprises posting a message to one or more of a social network, a professional network, an email network, a blog, and an instant message network;
    determining a system action based on the mood indicator value and the user action, wherein the system action includes one of:
        blocking an execution of the user action;
        delaying the execution of the user action for a particular time period, and upon expiration of the particular time period, presenting a confirmation option for execution of the user action; and
        directing the user action to an alternate destination for execution; and
    applying the system action.

2. The method of claim 1, wherein the keystroke dynamics include one or more of keystroke strength and keystroke speed.

3. The method of claim 1, further comprising determining the mood indicator value as one of a plurality of alphanumeric categories.

4. The method of claim 1, further comprising determining the mood indicator value as one of a plurality of numeric values.

5. The method of claim 1, further comprising determining the system action further based on one or more of a time of day, a location of the user, and a computing device employed by the user.

6. The method of claim 1, further comprising determining the system action based on applying one or more rules.

7. The method of claim 6, wherein the one or more rules are predefined rules customizable by the user.

8. A computing device to filter user's actions based on user's mood, the computing device comprising:
    a memory configured to store instructions;
    a processor configured to execute a mood based control application in conjunction with the instructions stored in the memory, wherein the mood based control application is configured to:
        detect a user's mood through one or more of: keystroke dynamics detection, facial feature analysis, body composure analysis, biological parameter analysis, and recent communication content analysis, wherein the biological parameters include one or more of a blood pressure, a heartbeat, and a body temperature and wherein the keystroke dynamics include one or more of keystroke strength and keystroke speed;
        determine a mood indicator value based on the detected user's mood;
        identify a user action, wherein the user action comprises posting a message to one or more of a social network, a professional network, an email network, a blog, and an instant message network;
        determine a system action based on the mood indicator value and the user action, wherein the system action includes to one of:
            block an execution of the user action;
            delay the execution of the user action for a particular time period, and upon expiration of the particular time period, presenting a confirmation option for execution of the user action; and
            direct the user action to an alternate destination for execution; and
        apply the system action.

9. The computing device of claim 8, wherein the mood based control application is further configured to determine the mood indicator value as one of a plurality of alphanumeric categories.

10. The computing device of claim 8, wherein the mood based control application is further configured to determine the mood indicator value as one of a plurality of numeric values.

11. The computing device of claim 8, wherein the mood based control application is further configured to determine the system action based on applying one or more rules.

12. The computing device of claim 8, wherein the mood based control application is further configured to prompt the user to confirm application of the system action.

13. The computing device of claim 8, wherein the computing, device is one of a desktop computer, a laptop computer, a handheld computer, a tablet computer, or a smart phone.

14. The computing device of claim 8, wherein the computing device is a server accessible to user computing devices through one or more networks.

15. A non-transitory computer readable memory device with instructions stored thereon to filter user's actions based on user's mood, the instructions comprising:
- detecting a user's mood through one or more of: keystroke dynamics detection, facial feature analysis, body composure analysis, biological parameter analysis, and recent communication content analysis, wherein the biological parameters include one or more of a blood pressure, a heartbeat, and a body temperature;
- determining a mood indicator value based on the detected user's mood;
- identifying a user action that includes posting a message to one or more of a social network, a professional network, an email network, a blog, and an instant message network;
- determining a system action based on the mood indicator value and the user action, wherein the system action includes one of:
  - blocking the execution of the user action;
  - delaying the execution of the user action for a particular time period, and upon expiration of the particular time period, presenting a confirmation option for execution of the user action; and
  - directing the user action to an alternate destination for execution and applying the system action.

16. The non-transitory computer readable memory device of claim 15, wherein the instructions further comprise determining the mood indicator value as one of a plurality of alphanumeric categories wherein the plurality of alphanumeric categories include one or more of neutral, happy, sad, depressed, or angry.

17. The non-transitory computer readable memory device of claim 15, wherein the instructions further comprise determining the mood indicator value as one of a plurality of numeric values.

18. The non-transitory computer readable memory device of claim 15, wherein the instructions further comprise determining the system action further based on one or more of a time of day, a location of the user, and a computing device employed by the user.

19. The non-transitory computer readable memory device of claim 15, wherein the instructions further comprise determining the system action based on applying one or more rules.

20. The non-transitory computer readable memory device of claim 19, wherein the one or more rules are predefined rules customizable by the user.

21. The non-transitory computer readable memory device of claim 15, wherein the instructions further comprise performing a calibration of a mood detection module based on user characteristics.

* * * * *